US011812315B2

(12) United States Patent
Zhang et al.

(10) Patent No.: US 11,812,315 B2
(45) Date of Patent: Nov. 7, 2023

(54) HANDOVERS USING DUAL ACTIVE PROTOCOL STACK AND FULL-DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 17/387,587

(22) Filed: Jul. 28, 2021

(65) Prior Publication Data
US 2022/0046496 A1    Feb. 10, 2022

Related U.S. Application Data

(60) Provisional application No. 62/706,243, filed on Aug. 6, 2020.

(51) Int. Cl.
*H04W 36/00* (2009.01)
*H04L 5/14* (2006.01)
*H04W 8/24* (2009.01)

(52) U.S. Cl.
CPC .......... *H04W 36/0069* (2018.08); *H04L 5/14* (2013.01); *H04W 8/24* (2013.01); *H04W 36/0061* (2013.01)

(58) Field of Classification Search
CPC .............. H04W 36/0069; H04W 8/24; H04W 36/0061; H04L 5/14
See application file for complete search history.

(56) References Cited

U.S. PATENT DOCUMENTS

| | | | |
|---|---|---|---|
| 2020/0145888 A1* | 5/2020 | Paladugu | H04W 36/18 |
| 2020/0329405 A1* | 10/2020 | Awoniyi-Oteri | H04B 7/0695 |
| 2021/0105673 A1* | 4/2021 | Jassal | H04W 36/0069 |
| 2022/0386204 A1* | 12/2022 | Parichehrehteroujeni | H04W 74/0833 |

* cited by examiner

*Primary Examiner* — Jackie Zuniga Abad
(74) *Attorney, Agent, or Firm* — Arun Swain

(57) ABSTRACT

Various aspects of the present disclosure generally relate to wireless communication. In some aspects, a user equipment (UE) may transmit, to a base station, an indication that the UE supports dual active protocol stack (DAPS) based handover capability and full-duplex operation capability. The UE may perform a full-duplex based DAPS handover based at least in part on the indication. Numerous other aspects are provided.

30 Claims, 6 Drawing Sheets

HANDOVERS USING DUAL ACTIVE PROTOCOL STACK AND FULL-DUPLEX OPERATION

CROSS-REFERENCE TO RELATED APPLICATION

This Patent Application claims priority to Provisional Patent Application No. 62/706,243, filed on Aug. 6, 2020, entitled "HANDOVERS USING DUAL ACTIVE PROTOCOL STACK AND FULL-DUPLEX OPERATION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for handovers using dual active protocol stack and full-duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: transmitting, to a base station, an indication that the UE supports dual active protocol stack (DAPS) based handover capability and full-duplex operation capability; and performing a full-duplex based DAPS handover based at least in part on the indication.

In some aspects, a method of wireless communication performed by a base station includes: receiving an indication that a UE supports DAPS-based handover capability and full-duplex operation capability; and performing a full-duplex based DAPS handover of the UE based at least in part on the indication.

In some aspects, a UE for wireless communication includes: a memory; and one or more processors coupled to the memory, the one or more processors configured to: transmit, to a base station, an indication that the UE supports DAPS-based handover capability and full-duplex operation capability; and perform a full-duplex based DAPS handover based at least in part on the indication.

In some aspects, a base station for wireless communication includes: a memory; and one or more processors coupled to the memory, the one or more processors configured to: receive an indication that a UE supports DAPS-based handover capability and full-duplex operation capability; and perform a full-duplex based DAPS handover of the UE based at least in part on the indication.

In some aspects, a non-transitory computer-readable medium storing a set of instructions for wireless communication includes: one or more instructions that, when executed by one or more processors of a UE, cause the UE to: transmit, to a base station, an indication that the UE supports DAPS-based handover capability and full-duplex operation capability; and perform a full-duplex based DAPS handover based at least in part on the indication.

In some aspects, a non-transitory computer-readable medium storing a set of instructions for wireless communication includes: one or more instructions that, when executed by one or more processors of a base station, cause the base station to: receive an indication that a UE supports DAPS-based handover capability and full-duplex operation capability; and perform a full-duplex based DAPS handover of the UE based at least in part on the indication.

In some aspects, an apparatus for wireless communication includes: means for transmitting, to a base station, an indication that the apparatus supports DAPS-based handover capability and full-duplex operation capability; and means for performing a full-duplex based DAPS handover based at least in part on the indication.

In some aspects, an apparatus for wireless communication includes: means for receiving an indication that a UE supports DAPS-based handover capability and full-duplex operation capability; and means for performing a full-duplex based DAPS handover of the UE based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
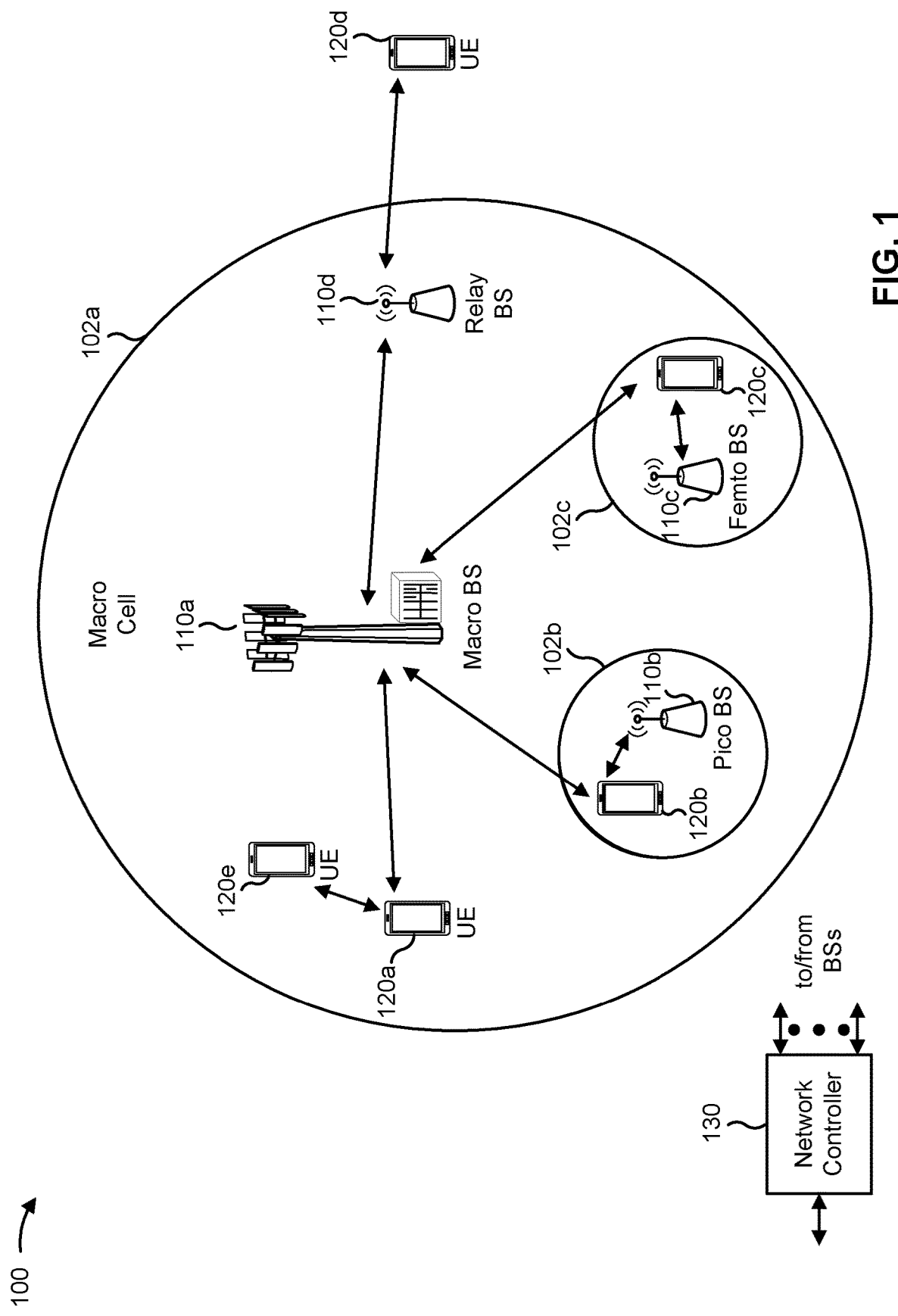
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
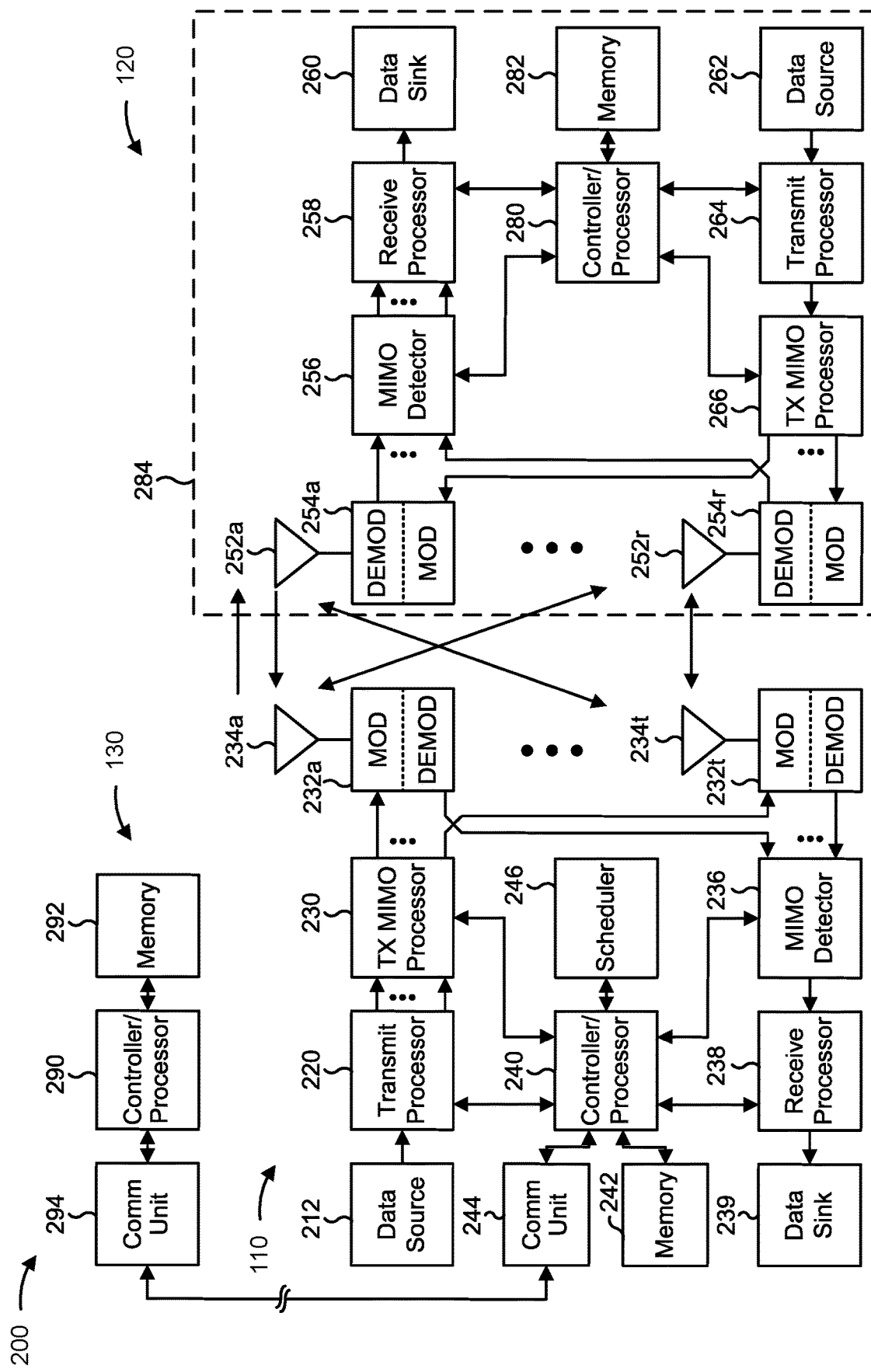
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with handovers using dual active protocol stack and full-duplex operation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for transmitting, to a base station, an indication that the UE supports DAPS-based handover capability and full-duplex operation capability; means for performing a full-duplex based DAPS handover based at least in part on the indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving an indication that a UE supports DAPS-based handover capability and full-duplex operation capability; means for performing a full-duplex based DAPS handover of the UE based at least in part on the indication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
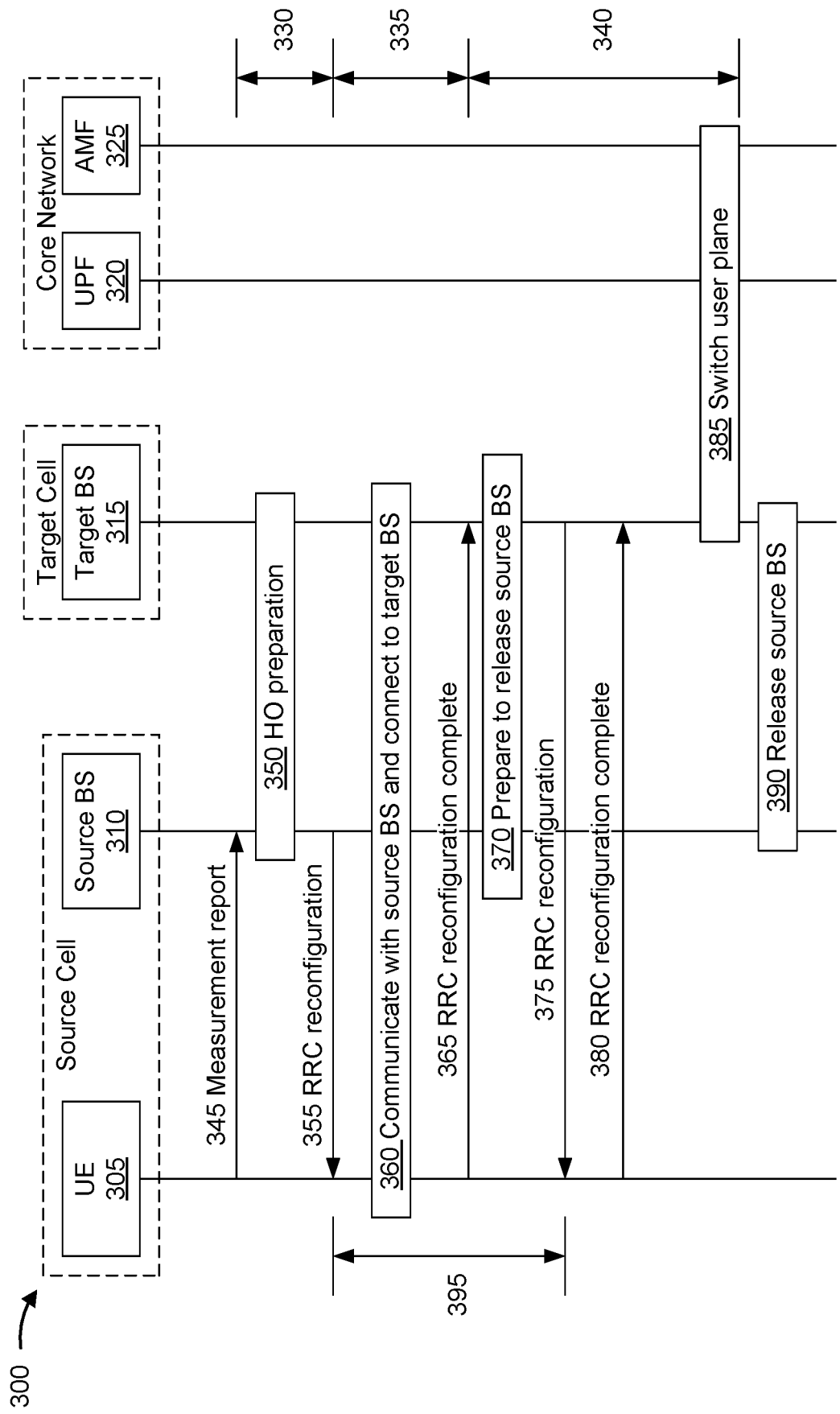
FIG. 3 is a diagram illustrating an example of make-before-break handover, in accordance with the present disclosure.

FIG. 3 is a diagram illustrating an example 300 of make-before-break handover, in accordance with the present disclosure.

As shown in FIG. 3, a make-before-break (MBB) handover procedure may involve a UE 305, a source base station 310, a target base station 315, a user plane function (UPF) device 320, and an access and mobility management function (AMF) device 325. The UE 305 may correspond to the UE 120 described elsewhere herein. The source base station 310 and/or the target base station 315 may correspond to the base station 110 described elsewhere herein. The UPF device 320 and/or the AMF device 325 may correspond to the network controller 130 described elsewhere herein. The UE 305 and the source base station 310 may be connected (e.g., may have a radio resource control (RRC) connection) via a serving cell or a source cell, and the UE 305 may undergo a handover to the target base station 315 via a target cell. The UPF device 320 and/or the AMF device 325 may be located within a core network. The source base station 310 and the target base station 315 may be in communication with the core network for mobility support and user plane functions. The MBB handover procedure may include an enhanced MBB (eMBB) handover procedure.

As shown, the MBB handover procedure may include a handover preparation phase 330, a handover execution phase 335, and a handover completion phase 340. During the handover preparation phase 330, the UE 305 may report measurements that cause the source base station 310 and/or the target base station 315 to prepare for handover and trigger execution of the handover. During the handover execution phase 335, the UE 305 may execute the handover by performing a random access procedure with the target base station 315 and establishing an RRC connection with the target base station 315. During the handover completion phase 340, the source base station 310 may forward stored communications associated with the UE 305 to the target base station 315, and the UE 305 may be released from a connection with the source base station 310.

As shown by reference number 345, the UE 305 may perform one or more measurements, and may transmit a measurement report to the source base station 310 based at least in part on performing the one or more measurements (e.g., serving cell measurements, neighbor cell measurements, and/or the like). The measurement report may indicate, for example, an RSRP parameter, an RSRQ parameter, an RSSI parameter, a signal-to-interference-plus-noise-ratio (SINR) parameter, and/or the like (e.g., for the serving cell, one or more neighbor cells, and/or the like). The source base station 310 may use the measurement report to determine whether to trigger a handover to the target base station 315. For example, if one or more measurements satisfy a condition, then the source base station 310 may trigger a handover of the UE 305 to the target base station 315.

As shown by reference number 350, the source base station 310 and the target base station 315 may communicate with one another to prepare for a handover of the UE 305. As part of the handover preparation, the source base station 310 may transmit a handover request to the target base station 315 to instruct the target base station 315 to prepare for the handover. The source base station 310 may communicate RRC context information associated with the UE 305 and/or configuration information associated with the UE 305 to the target base station 315. The target base station 315 may prepare for the handover by reserving resources for the UE 305. After reserving the resources, the target base station 315 may transmit an acknowledgement (ACK) to the source base station 310 in response to the handover request.

As shown by reference number 355, the source base station 310 may transmit an RRC reconfiguration message to the UE 305. The RRC reconfiguration message may include a handover command instructing the UE 305 to execute a handover procedure from the source base station 310 to the target base station 315. The handover command may include information associated with the target base station 315, such as a random access channel (RACH) preamble assignment for accessing the target base station 315. Reception of the RRC reconfiguration message, including the handover command, by the UE 305 may trigger the start of the handover execution phase 335.

As shown by reference number 360, during the handover execution phase 335 of the MBB handover, the UE 305 may execute the handover by performing a random access procedure with the target base station 315 (e.g., including synchronization with the target base station 315) while continuing to communicate with the source base station 310. For example, while the UE 305 is performing the random access procedure with the target base station 315, the UE 305 may transmit uplink data, uplink control information, an uplink reference signal (e.g., a sounding reference signal), and/or the like to the source base station 310, and/or may receive downlink data, downlink control information, a downlink reference signal, and/or the like from the source base station 310.

As shown by reference number 365, upon successfully establishing a connection with the target base station 315 (e.g., via a random access procedure), the UE may transmit an RRC reconfiguration completion message to the target base station 315. Reception of the RRC reconfiguration message by the target base station 315 may trigger the start of the handover completion phase 340.

As shown by reference number 370, the source base station 310 and the target base station 315 may communicate with one another to prepare for release of the connection between the source base station 310 and the UE 305. In some aspects, the target base station 315 may determine that a connection between the source base station 310 and the UE 305 is to be released, such as after receiving the RRC reconfiguration message from the UE 305. In this case, the target base station 315 may transmit a handover connection setup completion message to the source base station 310. The handover connection setup completion message may cause the source base station 310 to stop transmitting data to the UE 305 and/or to stop receiving data from the UE 305. Additionally, or alternatively, the handover connection setup completion message may cause the source base station 310 to forward communications associated with the UE 305 to the target base station 315 and/or to notify the target base station 315 of a status of one or more communications with the UE 305. For example, the source base station 310 may forward, to the target base station 315, buffered downlink communications (e.g., downlink data) for the UE 305 and/or uplink communications (e.g., uplink data) received from the UE 305. Additionally, or alternatively, the source base station 310 may notify the target base station 315 regarding a packet data convergence protocol (PDCP) status associated with the UE 305, a sequence number to be used for a downlink communication with the UE 305, and/or the like.

As shown by reference number 375, the target base station 315 may transmit an RRC reconfiguration message to the UE 305 to instruct the UE 305 to release the connection with the source base station 310. Upon receiving the instruction to release the connection with the source base station 310, the UE 305 may stop communicating with the source base station 310. For example, the UE 305 may refrain from transmitting uplink communications to the source base station 310 and/or may refrain from monitoring for downlink communications from the source base station 310.

As shown by reference number 380, the UE may transmit an RRC reconfiguration completion message to the target base station 315 to indicate that the connection between the source base station 310 and the UE 305 is being released or has been released.

As shown by reference number 385, the target base station 315, the UPF device 320, and/or the AMF device 325 may communicate to switch a user plane path of the UE 305 from the source base station 310 to the target base station 315. Prior to switching the user plane path, downlink communications for the UE 305 may be routed through the core network to the source base station 310. After the user plane path is switched, downlink communications for the UE 305 may be routed through the core network to the target base station 315. Upon completing the switch of the user plane path, the AMF device 325 may transmit an end marker message to the source base station 310 to signal completion of the user plane path switch. As shown by reference number 390, the target base station 315 and the source base station 310 may communicate to release the source base station 310.

As part of the MBB handover procedure, the UE 305 may maintain simultaneous connections with the source base station 310 and the target base station 315 during a time period 395. The time period 395 may start at the beginning of the handover execution phase 335 (e.g., upon reception by the UE 305 of a handover command from the source base station 310) when the UE 305 performs a random access procedure with the target base station 315. The time period 395 may end upon release of the connection between the UE 305 and the source base station 310 (e.g., upon reception by the UE 305 of an instruction, from the target base station 315, to release the source base station 310). By maintaining simultaneous connections with the source base station 310 and the target base station 315, the handover procedure can be performed with zero or a minimal interruption to communications, thereby reducing latency.

As indicated above, FIG. 3 is provided as an example. Other examples may differ from what is described with respect to FIG. 3.

Some wireless networks may support UE communication with only a source cell during a transition period of a handover. The transition period of the handover may be defined as a period of time from initiating the handover (e.g., via a handover command) until receipt of a handover release command. However, communication with only the source cell during the transition period of the handover may cause a disruption to communication for the UE.

Some wireless networks may support UE communications with support for a dual active protocol stack (DAPS) based handover in which the UE may communicate with both a source cell (e.g., a source master cell group) and a target cell (e.g., target master cell group) during a handover. For example, the UE may be configured to simultaneously receive communications from the source cell and the target cell. In this way, a disruption to communication for the UE may be reduced and/or avoided. However, the UE may communicate with both the source cell and the target cell in a single uplink or downlink direction.

In some aspects described herein, a UE may indicate support for full-duplex communications and DAPS-based handover capability. For example, the UE may indicate support for full-duplex communications and DAPS-based handover capability based at least in part on the UE having components that support simultaneously transmitting and receiving communications. Based at least in part on receiving an indication that the UE supports full-duplex communications and DAPS-based handover, a base station (e.g., associated with a source cell) may transmit an indication to perform a full-duplex based DAPS-based handover of the UE to a target cell, in which the UE is configured to simultaneously transmit and receive communications from the source cell and/or the target cell during a handover transition period. In some aspects, the base station may transmit an indication (e.g., in a handover command) of a pair of beams (e.g., via reference signal identifications in transmission configuration indicator (TCI) states) and corresponding transmission or reception directions for the UE to use for full-duplex communications during the transition period.

Based at least in part on using full-duplex communications during the transition period, the UE may communicate with reduced latency (e.g., based at least in part on supporting reception of downlink signals during uplink-only slots, transmission of uplink signals during downlink-only slots, and/or the like) and increased spectral efficiency, which may conserve communication, network, and power resources of the UE and the base station.

Figure 4:
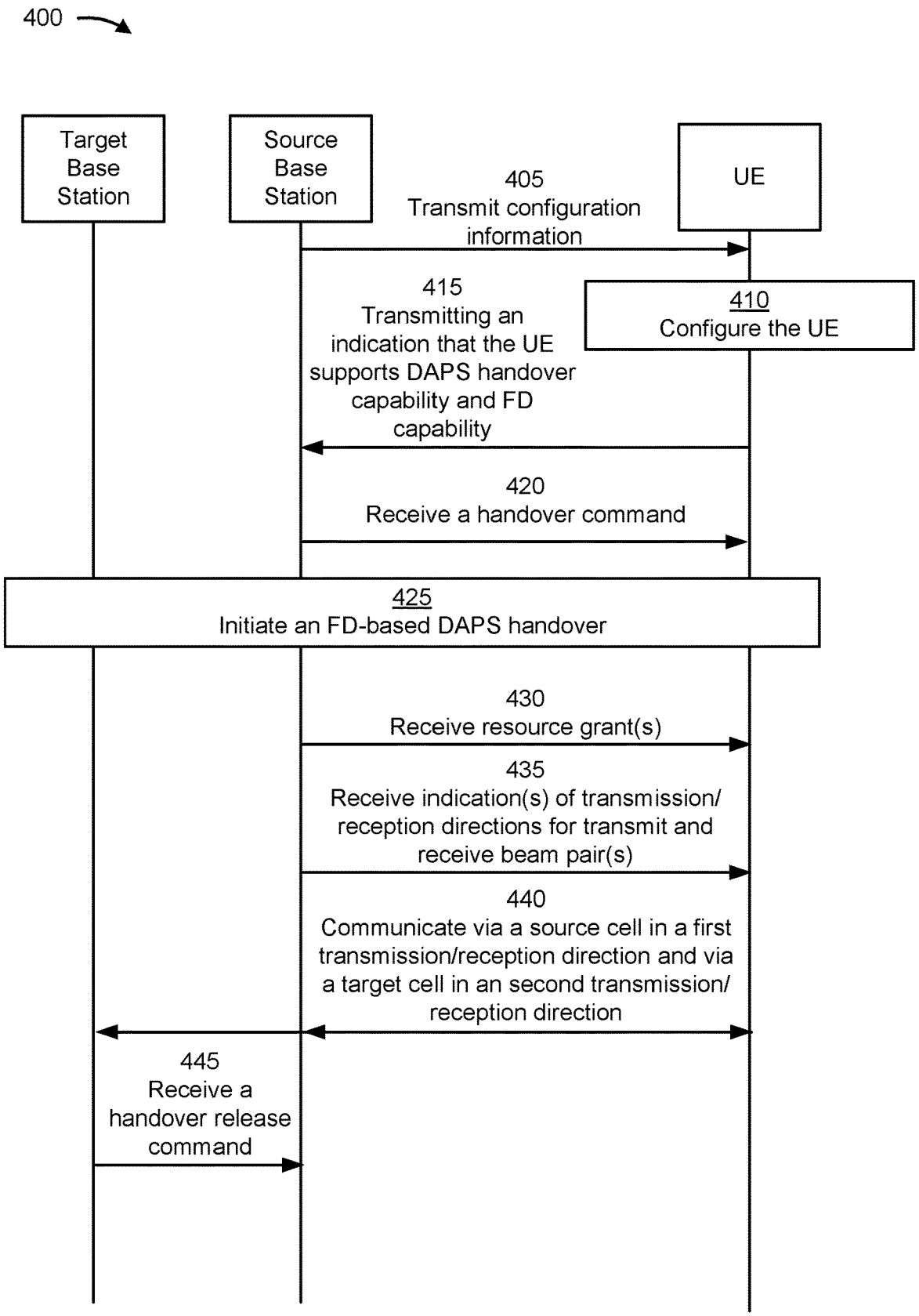
FIG. 4 is a diagram illustrating an example associated with handovers using dual active protocol stack and full-duplex operation, in accordance with the present disclosure.

FIG. 4 is a diagram illustrating an example 400 of handovers using DAPS and full-duplex operation, in accordance with the present disclosure. As shown in FIG. 4, a UE (e.g., UE 120) may communicate (e.g., transmit an uplink transmission and/or receive a downlink transmission) with a source base station (e.g., base station 110) and a target base station (e.g., base station 110) as part of a handover process. The UE, the source base station, and the target base station may be part of a wireless network (e.g., wireless network 100). The source base station may be associated with a source cell and/or source cell group and the target base station may be associated with a target source cell and/or a target cell group.

As shown by reference number 405, the source base station may transmit, and the UE may receive, configuration information. In some aspects, the UE may receive configuration information from another device (e.g., from another base station, another UE, and/or the like), a communication standard, and/or the like. In some aspects, the UE may receive the configuration information via one or more of RRC signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to transmit an indication that the UE supports DAPS-based handover capability and full-duplex capability. For example, the UE may be configured to transmit the indication via RRC signaling, MAC layer signal, and/or the like. In some aspects, the configuration information may indicate that the source base station may transmit an indication of transmission or reception directions for at least one transmit and receive beam pair used for full-duplex operation during a DAPS-based handover. For example, the configuration information may indicate that the source base station is to transmit an indication of a first beam for the UE to use for transmissions and a second beam for the UE to use for receptions for full-duplex operation during the DAPS-based handover.

As shown by reference number 410, the UE may configure the UE for communicating with the source base station, communicating with the target base station, performing a full-duplex based DAPS-based handover, and/or the like. In some aspects, the UE may configure the UE based at least in part on the configuration information. In some aspects, the UE may be configured to perform one or more operations described herein.

As shown by reference number 415, the UE may transmit, and the source base station may receive, an indication that the UE supports DAPS-based handover capability and full-duplex capability. In other words, the UE may indicate a capability of the UE to communicate (e.g., uplink transmissions and downlink transmissions) using a full-duplex based DAPS-based handover. In some aspects, the UE may transmit the indication via RRC signaling, one or more MAC CEs, a physical uplink control channel (PUCCH) message, and/or the like.

As shown by reference number 420, the UE may receive a handover command from the source base station. In some aspects, the source base station may transmit the handover command based at least in part on reception of a measurement report from the UE (e.g., as described with reference to reference number 345). In some aspects the source base station may transmit the handover command via RRC signaling to the UE.

As shown by reference number 425, the source base station, the target base station, and the UE may initiate a full-duplex based DAPS-based handover. The full-duplex based DAPS-based handover may include one or more operations described with reference to FIG. 3. For example, the source base station and the target base station may perform handover preparation (e.g., as described with reference to reference number 350), the source base station may transmit an RRC reconfiguration message (e.g., RRCReconfig) to the UE (e.g., as described with reference to reference number 355), the UE may transmit RRC signaling to the target base station (e.g., RRCReconfigComplete as described with reference to reference number 365), and/or the like. In some aspects, the source base station and the target base station may prepare to release the source base station (e.g., as described with reference to reference number 370), the target base station may transmit an RRC reconfiguration message (e.g., RRCReconfig) to the UE, and/or the like. In some aspects, the UE may transmit RRC signaling to the target base station (e.g., RRCReconfigComplete as described with reference to reference number 380), the target cell and a core network may coordinate to switch a user plane associated with the UE (e.g., as described with reference to reference number 385), the source base station may receive a handover release command (e.g., as described with reference to reference number 390), and/or the like. In some aspects, the operations of the full-duplex based DAPS-based handover may include one or more operations described in FIG. 4.

As shown by reference number 430, the UE may receive one or more resource grants from the source base station (e.g., via a source cell). For example, the UE may receive the one or more resource grants that schedule a transmission of a first communication and a simultaneous reception of a second communication during a transition period of the full-duplex based DAPS handover.

In some aspects, the first communication may be associated with a source cell, and the second communication may be associated with a target cell. In some aspects, the first communication may be associated with the target cell, and the second communication may be associated with the source cell. In other words, the one or more resource grants may schedule a first communication with the target cell using a first transmission or reception direction and may schedule a second communication with the source cell using a second transmission or reception direction that is the opposite of the first transmission or reception direction.

In some aspects, the first communication may be associated with a source cell, a source physical cell identifier (PCI), or a source TRP, and the second communication may be associated with a target cell, a target PCI, or a target TRP. In some aspects, the second communication may be associated with a source cell, a source PCI, or a source TRP, and the first communication may be associated with a target cell, a target PCI, or a target TRP.

In some aspects, the one or more resource grants may schedule multiple transmissions and/or multiple receptions for the UE for communicating with the source base station and the target base station. For example, the UE may communicate with the source base station in full-duplex mode while simultaneously transmitting to and/or receiving from the target base station, and/or the UE may communicate with the target base station in full-duplex mode while simultaneously transmitting to and/or receiving from the source base station.

As shown by reference number 435, the UE may receive one or more indications of transmission or reception directions for at least one transmit and receive beam pairs (e.g., used for full-duplex operation during a DAPS-based handover). In some aspects, the UE may receive the one or more indications with the handover command, the one or more resource grants, a separate communication, and/or the like. In some aspects, the one or more indications may indicate transmission or reception directions for communicating during a transition period of the handover.

In some aspects, the one or more indications may include a first reference signal identification, associated with a source cell, and a first transmission or reception direction that is associated with the first reference signal identification, and a second reference signal identification, associated with a target cell, and a second transmission or reception direction that is associated with the second reference signal identification.

As shown by reference number 440, the UE may communicate with a source cell, associated with the source base station, in a first transmission and/or reception direction and may communicate with a target cell, associated with the target base station, in a second transmission and/or reception direction. In other words, the UE may communicate with the source cell in a transmission and/or reception direction and may communicate with the target cell in a transmission and/or reception direction that is the opposite of at least one transmission and/or reception direction used to communicate with the source cell.

As shown by reference number 445, the source base station may receive a handover release command. In some aspects, the source base station may receive the handover release command via the target base station, a mobility management entity associated with the target base station and/or the source base station, and/or the like.

Based at least in part on using full-duplex communications during a transition period of a DAPS-based handover, the UE may communicate with reduced latency (e.g., based at least in part on supporting reception of downlink signals during uplink only slots) and increased spectral efficiency, which may conserve communication, network, and power resources of the UE and the source base station. In some aspects, communicating with reduced latency may reduce errors in the DAPS-based handover process.

As indicated above, FIG. 4 is provided as an example of operations associated with handovers using DAPS and full-duplex operation. Other examples may differ from what is described with regard to FIG. 4. For example, other examples may have additional operations or fewer operations, some of the operations may be combined into fewer operations, some of the operations may be performed in a different order, and/or the like.

Figure 5:
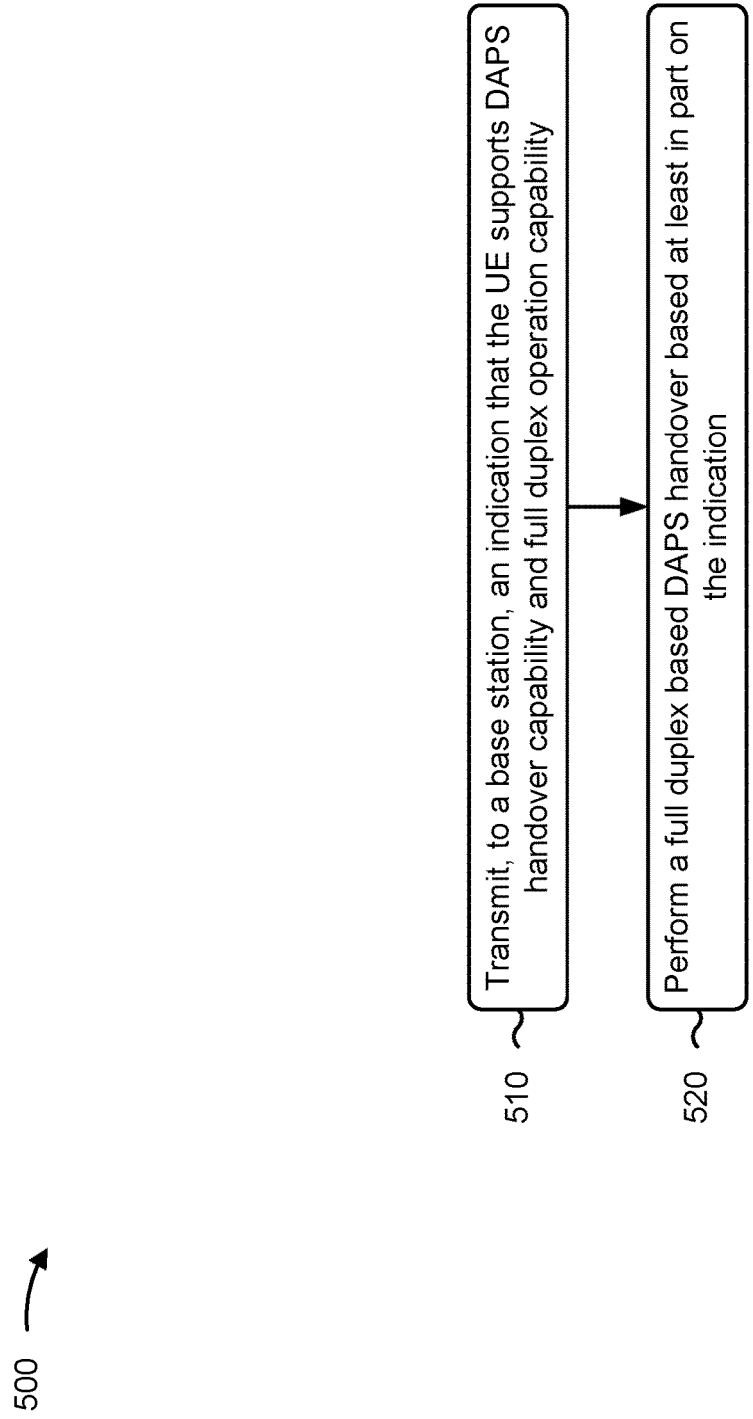
FIGS. 5 and 6 are diagrams illustrating example processes associated with handovers using dual active protocol stack and full-duplex operation, in accordance with the present disclosure.

FIG. 5 is a diagram illustrating an example process 500 performed, for example, by a UE, in accordance with the present disclosure. Example process 500 is an example where the UE (e.g., UE 120) performs operations associated with handovers using DAPS and full-duplex operation.

As shown in FIG. 5, in some aspects, process 500 may include transmitting, to a base station, an indication that the UE supports DAPS-based handover capability and full-duplex operation capability (block 510). For example, the UE (e.g., using antenna 252, transmit processor 264, TX MIMO processor 266, modulator 254, controller/processor 280, and/or memory 282) may transmit, to a base station, an indication that the UE supports DAPS-based handover capability and full-duplex operation capability, as described above.

As further shown in FIG. 5, in some aspects, process 500 may include performing a full-duplex based DAPS handover based at least in part on the indication (block 520). For example, the UE (e.g., using antenna 252, demodulator 254, MIMO detector 256, receive processor 258, transmit processor 264, TX MIMO processor 266, modulator 254, controller/processor 280, and/or memory 282) may perform a full-duplex based DAPS handover based at least in part on the indication, as described above.

Process 500 may include additional aspects, such as any single aspect or any combination of aspects described below and/or in connection with one or more other processes described elsewhere herein.

In a first aspect, process 500 includes receiving one or more resource grants that schedule a transmission of a first communication and a simultaneous reception of a second communication during a transition period of the full-duplex based DAPS handover.

In a second aspect, alone or in combination with the first aspect, the first communication is associated with a source cell and the second communication is associated with a target cell, or the first communication is associated with the target cell and the second communication is associated with the source cell.

In a third aspect, alone or in combination with one or more of the first and second aspects, the first communication is associated with a source cell, a source PCI, or a source TRP, and the second communication is associated with a target cell, a target PCI, or a target TRP.

In a fourth aspect, alone or in combination with one or more of the first through third aspects, the second communication is associated with a source cell, a source PCI, or a source TRP, and the first communication is associated with a target cell, a target PCI, or a target TRP.

In a fifth aspect, alone or in combination with one or more of the first through fourth aspects, receiving the one or more resource grants includes one or more of receiving the one or more resource grants from a source cell.

In a sixth aspect, alone or in combination with one or more of the first through fifth aspects, process 500 includes receiving one or more indications, for communicating during a transition period of the handover, of a first reference signal identification, associated with a source cell, and a first transmission or reception direction that is associated with the first reference signal identification, and a second reference signal identification, associated with a target cell, and a second transmission or reception direction that is associated with the second reference signal identification.

In a seventh aspect, alone or in combination with one or more of the first through sixth aspects, receiving the one or more indications includes receiving a handover command that indicates the first reference signal identification, associated with the source cell, and the first transmission or reception direction, and the second reference signal identification, associated with the target cell, and the second transmission or reception direction.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
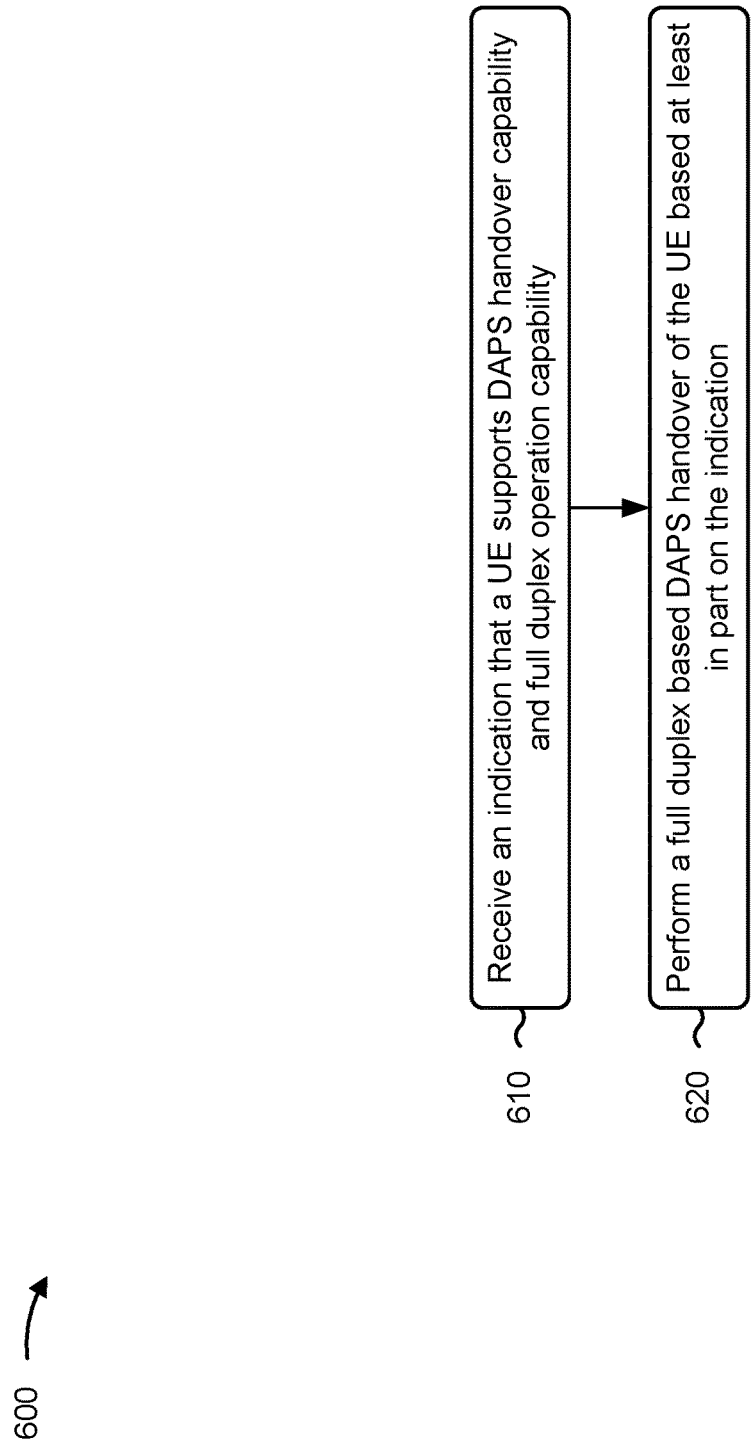

FIG. 6 is a diagram illustrating an example process 600 performed, for example, by a base station, in accordance with the present disclosure. Example process 600 is an example where the base station (e.g., base station 110) performs operations associated with handovers using DAPS and full-duplex operation.

As shown in FIG. 6, in some aspects, process 600 may include receiving an indication that a UE supports DAPS-based handover capability and full-duplex operation capability (block 610). For example, the base station (e.g., using antenna 234, demodulator 232, MIMO detector 236, receive processor 238, controller/processor 240, and/or memory 242) may receive an indication that a UE supports DAPS-based handover capability and full-duplex operation capability, as described above.

As further shown in FIG. 6, in some aspects, process 600 may include performing a full-duplex based DAPS handover of the UE based at least in part on the indication (block 620). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may perform a full-duplex based DAPS handover of the UE based at least in part on the indication, as described above.

Process 600 may include additional aspects, such as any single aspect or any combination of aspects described below and/or in connection with one or more other processes described elsewhere herein.

In a first aspect, process 600 includes transmitting one or more resource grants that schedule, for the UE, one or more of a transmission of a first communication or a reception of a second communication during a transition period of the full-duplex based DAPS handover, wherein the UE is configured to simultaneously transmit the first communication and receive the second communication.

In a second aspect, alone or in combination with the first aspect, the first communication is associated with a source cell and the second communication is associated with a target cell, or the first communication is associated with the target cell and the second communication is associated with the source cell.

In a third aspect, alone or in combination with one or more of the first and second aspects, the first communication is associated with a source cell, a source PCI, or a source TRP, and the second communication is associated with a target cell, a target PCI, or a target TRP.

In a fourth aspect, alone or in combination with one or more of the first through third aspects, the second communication is associated with a source cell, a source PCI, or a source TRP, and the first communication is associated with a target cell, a target PCI, or a target TRP.

In a fifth aspect, alone or in combination with one or more of the first through fourth aspects, transmitting the one or more resource grants includes one or more of transmitting the one or more resource grants via a source cell.

In a sixth aspect, alone or in combination with one or more of the first through fifth aspects, process 600 includes transmitting one or more indications, for the UE to communicate during a transition period of the handover, of a first reference signal identification, associated with a source cell, and a first transmission or reception direction that is associated with the first reference signal identification, and a second reference signal identification, associated with a target cell, and a second transmission or reception direction that is associated with the second reference signal identification.

In a seventh aspect, alone or in combination with one or more of the first through sixth aspects, transmitting the one or more indications includes transmitting a handover command that indicates the first reference signal identification, associated with the source cell, and the first transmission or reception direction, and the second reference signal identification, associated with the target cell, and the second transmission or reception direction.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Aspect 1: A method of wireless communication performed by a user equipment (UE), comprising: transmitting, to a base station, an indication that the UE supports dual active protocol stack (DAPS) based handover capability and full-duplex operation capability; and performing a full-duplex based DAPS handover based at least in part on the indication.

Aspect 2: The method of Aspect 1, further comprising: receiving one or more resource grants that schedule a transmission of a first communication and a simultaneous reception of a second communication during a transition period of the full-duplex based DAPS handover.

Aspect 3: The method of Aspect 2, wherein the first communication is associated with a source cell and the second communication is associated with a target cell, or wherein the first communication is associated with the target cell and the second communication is associated with the source cell.

Aspect 4: The method of Aspect 2, wherein the first communication is associated with a source cell, a source physical cell identifier (PCI), or a source transmit receive point (TRP), and wherein the second communication is associated with a target cell, a target PCI, or a target TRP.

Aspect 5: The method of Aspect 2, wherein the second communication is associated with a source cell, a source physical cell identifier (PCI), or a source transmit receive point (TRP), and wherein the first communication is associated with a target cell, a target PCI, or a target TRP.

Aspect 6: The method of any of Aspects 2-5, wherein receiving the one or more resource grants comprises one or more of: receiving the one or more resource grants from a source cell Aspect 7: The method of Aspect 1, further comprising: receiving one or more indications, for communicating during a transition period of the full-duplex based DAPS handover, of: a first reference signal identification, associated with a source cell, and a first transmission or reception direction that is associated with the first reference signal identification, and a second reference signal identification, associated with a target cell, and a second transmission or reception direction that is associated with the second reference signal identification.

Aspect 8: The method of Aspect 7, wherein receiving the one or more indications comprises: receiving a handover command that indicates: the first reference signal identification, associated with the source cell, and the first transmission or reception direction, and the second reference signal identification, associated with the target cell, and the second transmission or reception direction.

Aspect 9: A method of wireless communication performed by a base station, comprising: receiving an indication that a user equipment (UE) supports dual active protocol stack (DAPS) based handover capability and full-duplex operation capability; and performing a full-duplex based DAPS handover of the UE based at least in part on the indication.

Aspect 10: The method of Aspect 9, further comprising: transmitting one or more resource grants that schedule, for the UE, one or more of a transmission of a first communication or a reception of a second communication during a transition period of the full-duplex based DAPS handover, wherein the UE is configured to simultaneously transmit the first communication and receive the second communication.

Aspect 11: The method of Aspect 10, wherein the first communication is associated with a source cell and the second communication is associated with a target cell, or wherein the first communication is associated with the target cell and the second communication is associated with the source cell.

Aspect 12: The method of Aspect 10, wherein the first communication is associated with a source cell, a source physical cell identifier (PCI), or a source transmit receive point (TRP), and wherein the second communication is associated with a target cell, a target PCI, or a target TRP.

Aspect 13: The method of Aspect 10, wherein the second communication is associated with a source cell, a source physical cell identifier (PCI), or a source transmit receive point (TRP), and wherein the first communication is associated with a target cell, a target PCI, or a target TRP.

Aspect 14: The method of any of Aspects 10-13, wherein transmitting the one or more resource grants comprises one or more of: transmitting the one or more resource grants via a source cell.

Aspect 15: The method of Aspect 9, further comprising: transmitting one or more indications, for the UE to communicate during a transition period of the full-duplex based DAPS handover, of: a first reference signal identification, associated with a source cell, and a first transmission or reception direction that is associated with the first reference signal identification, and a second reference signal identification, associated with a target cell, and a second transmission or reception direction that is associated with the second reference signal identification.

Aspect 16: The method of Aspect 15, wherein transmitting the one or more indications comprises: transmitting a handover command that indicates: the first reference signal identification, associated with the source cell, and the first transmission or reception direction, and the second reference signal identification, associated with the target cell, and the second transmission or reception direction.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit, to a base station, an indication that the UE supports dual active protocol stack (DAPS) based handover capability and full-duplex operation capability; and
      perform a full-duplex based DAPS handover in accordance with the indication,
   the one or more processors, to perform the full-duplex based DAPS handover, being configured to:
      simultaneously transmit a first communication to a source cell and receive a second communication from a target cell, or
      simultaneously transmit the first communication to the target cell and receive the second communication from the source cell.

2. The UE of claim 1, wherein the one or more processors are further configured to:
   receive one or more resource grants that schedule the simultaneous transmission of the first communication and reception of the second communication during a transition period of the full-duplex based DAPS handover.

3. The UE of claim 2, wherein the first communication is associated with a source physical cell identifier (PCI) or a source transmit receive point (TRP), and wherein the second communication is associated with a target PCI or a target TRP.

4. The UE of claim 2, wherein the second communication is associated with a source physical cell identifier (PCI) or a source transmit receive point (TRP), and
   wherein the first communication is associated with a target PCI or a target TRP.

5. The UE of claim 2, wherein the one or more processors, to receive the one or more resource grants, are configured to:
   receive the one or more resource grants from the source cell.

6. The UE of claim 1, wherein the one or more processors are further configured to:
   receive one or more indications, for communicating during a transition period of the full-duplex based DAPS handover, of:
      a first reference signal identification, associated with the source cell, and a first transmission or reception direction that is associated with the first reference signal identification, and
      a second reference signal identification, associated with the target cell, and a second transmission or reception direction that is associated with the second reference signal identification.

7. The UE of claim 6, wherein the one or more processors, to receive the one or more indications, are configured to:
   receive a handover command that indicates:
      the first reference signal identification, associated with the source cell, and the first transmission or reception direction, and
      the second reference signal identification, associated with the target cell, and the second transmission or reception direction.

8. A base station for wireless communication, comprising:
   a memory; and
   one or more processors, coupled to the memory, configured to:
      receive an indication that a user equipment (UE) supports dual active protocol stack (DAPS) based handover capability and full-duplex operation capability; and
      perform a full-duplex based DAPS handover of the UE in accordance with the indication,
   the one or more processors, to perform the full-duplex based DAPS handover, being configured to:
      simultaneously receive a first communication from the UE while a second communication is transmitted from a target cell, or
      simultaneously transmit the second communication to the UE while the first communication is received at the target cell.

9. The base station of claim 8, wherein the one or more processors are further configured to:
   transmit one or more resource grants that schedule, for the UE, the simultaneous reception of the first communication and transmission of the second communication during a transition period of the full-duplex based DAPS handover.

10. The base station of claim 9, wherein the base station is associated with a source cell.

11. The base station of claim 9, wherein the first communication is associated with a source cell, a source physical cell identifier (PCI), or a source transmit receive point (TRP), and
    wherein the second communication is associated with a target PCI or a target TRP.

12. The base station of claim 9, wherein the second communication is associated with a source cell, a source physical cell identifier (PCI), or a source transmit receive point (TRP), and
    wherein the first communication is associated with a target PCI or a target TRP.

13. The base station of claim 9, wherein the one or more processors, to transmit the one or more resource grants, are configured to:
    transmit the one or more resource grants via a source cell.

14. The base station of claim 8, wherein the one or more processors are further configured to:
transmit one or more indications, for the UE to communicate during a transition period of the full-duplex based DAPS handover, of:
a first reference signal identification, associated with a source cell, and a first transmission or reception direction that is associated with the first reference signal identification, and
a second reference signal identification, associated with the target cell, and a second transmission or reception direction that is associated with the second reference signal identification.

15. The base station of claim 14, wherein the one or more processors, to transmit the one or more indications, are configured to:
transmit a handover command that indicates:
the first reference signal identification, associated with the source cell, and the first transmission or reception direction, and
the second reference signal identification, associated with the target cell, and the second transmission or reception direction.

16. The base station of claim 8, wherein the one or more processors are further configured to:
receive a handover release command.

17. A method of wireless communication performed at a user equipment (UE), comprising:
transmitting, to a base station, an indication that the UE supports dual active protocol stack (DAPS) based handover capability and full-duplex operation capability; and
performing a full-duplex based DAPS handover in accordance with the indication, the performing of the full-duplex based DAPS handover comprising:
simultaneously transmitting a first communication to a source cell and receiving a second communication from a target cell, or
simultaneously transmitting the first communication to the target cell and receiving the second communication from the source cell.

18. The method of claim 17, further comprising:
receiving one or more resource grants that schedule the simultaneous transmission of the first communication and reception of the second communication during a transition period of the full-duplex based DAPS handover.

19. The method of claim 18, wherein the first communication is associated with a source physical cell identifier (PCI) or a source transmit receive point (TRP), and
wherein the second communication is associated with a target PCI or a target TRP.

20. The method of claim 18, wherein the second communication is associated with a source physical cell identifier (PCI) or a source transmit receive point (TRP), and
wherein the first communication is associated with a target PCI or a target TRP.

21. The method of claim 17, further comprising:
receiving one or more indications, for communicating during a transition period of the full-duplex based DAPS handover, of:
a first reference signal identification, associated with the source cell, and a first transmission or reception direction that is associated with the first reference signal identification, and
a second reference signal identification, associated with the target cell, and a second transmission or reception direction that is associated with the second reference signal identification.

22. The method of claim 21, wherein receiving the one or more indications comprises:
receiving a handover command that indicates:
the first reference signal identification, associated with the source cell, and the first transmission or reception direction, and
the second reference signal identification, associated with the target cell, and the second transmission or reception direction.

23. A method of wireless communication performed at a base station, comprising:
receiving an indication that a user equipment (UE) supports dual active protocol stack (DAPS) based handover capability and full-duplex operation capability; and
performing a full-duplex based DAPS handover of the UE in accordance with the indication, the performing of the full-duplex based DAPS handover comprising:
simultaneously receiving a first communication from the UE while a second communication is transmitted from a target cell, or
simultaneously transmitting the second communication to the UE while the first communication is received at the target cell.

24. The method of claim 23, further comprising:
transmitting one or more resource grants that schedule, for the UE, the simultaneous reception of the first communication and transmission of the second communication during a transition period of the full-duplex based DAPS handover.

25. The method of claim 24, wherein the base station is associated with a source cell.

26. The method of claim 24, wherein the first communication is associated with a source cell, a source physical cell identifier (PCI), or a source transmit receive point (TRP), and
wherein the second communication is associated with a target PCI or a target TRP.

27. The method of claim 24, wherein the second communication is associated with a source cell, a source physical cell identifier (PCI), or a source transmit receive point (TRP), and
wherein the first communication is associated with a target PCI or a target TRP.

28. The method of claim 23, further comprising:
transmitting one or more indications, for the UE to communicate during a transition period of the full-duplex based DAPS handover, of:
a first reference signal identification, associated with a source cell, and a first transmission or reception direction that is associated with the first reference signal identification, and
a second reference signal identification, associated with the target cell, and a second transmission or reception direction that is associated with the second reference signal identification.

29. The method of claim 28, wherein transmitting the one or more indications comprises:
transmitting a handover command that indicates:
the first reference signal identification, associated with the source cell, and the first transmission or reception direction, and the second reference signal identification, associated with the target cell, and the second transmission or reception direction.

30. The method of claim 23, further comprising:
receiving a handover release command.

* * * * *